Aug. 23, 1932.  F. J. SHOOK ET AL  1,872,830
APPARATUS FOR MANUFACTURING TIRES
Filed Nov. 2, 1928   2 Sheets-Sheet 1
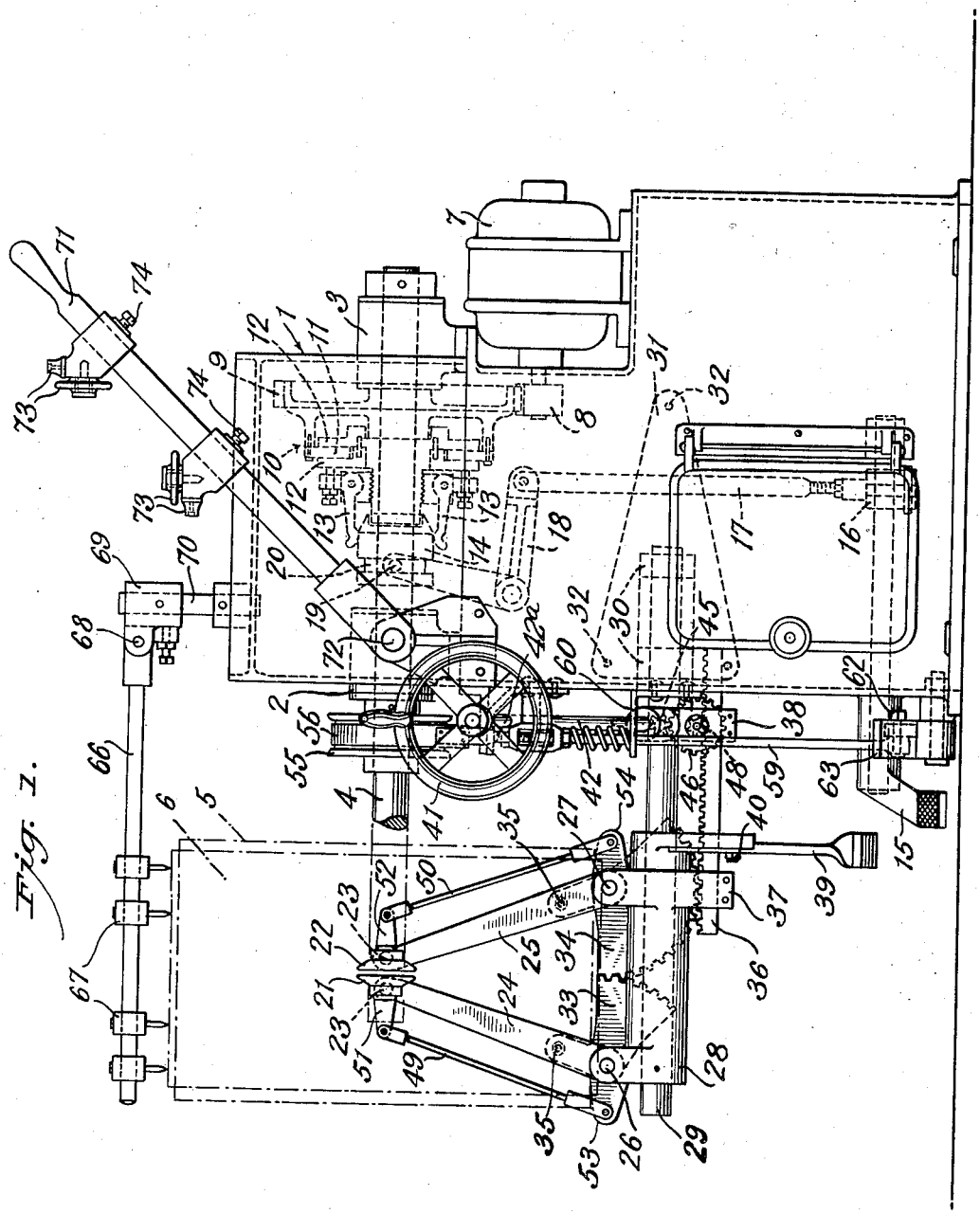
INVENTORS
Florain J. Shook
Allen L. Heston
BY
Ernest Hopkinson
ATTORNEY

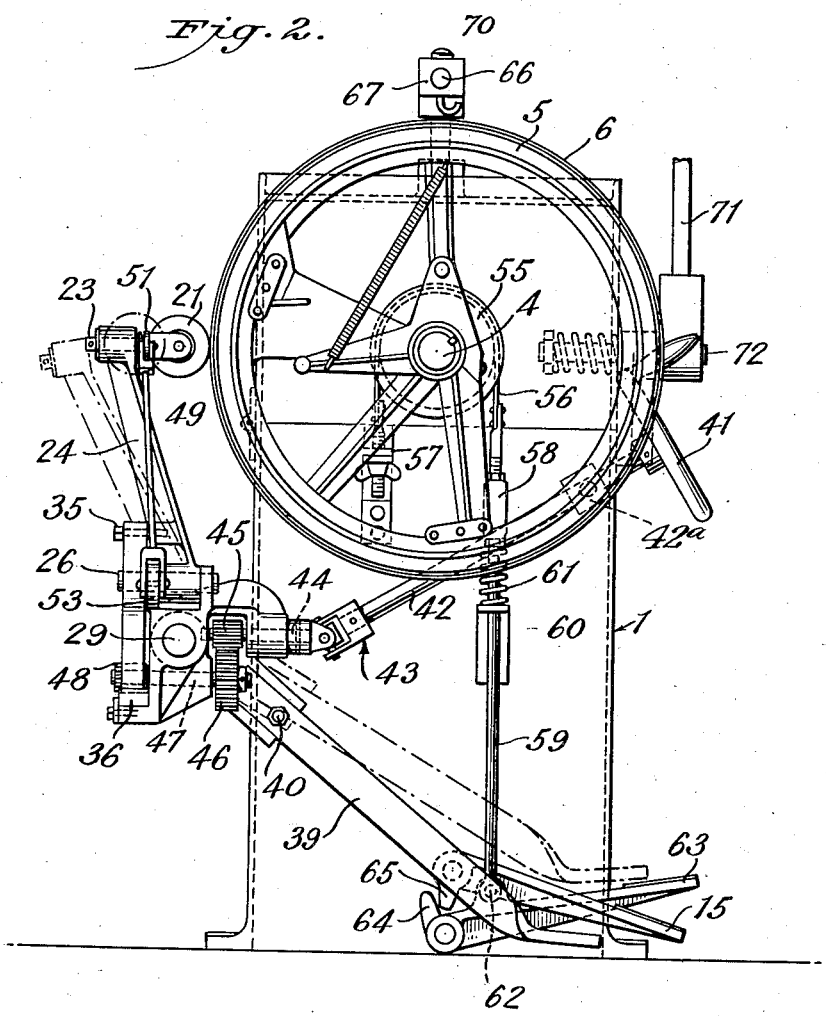

Patented Aug. 23, 1932

1,872,830

UNITED STATES PATENT OFFICE

FLORAIN J. SHOOK, OF AKRON, AND ALLEN L. HESTON, OF COLUMBIANA, OHIO, ASSIGNORS, BY MESNE ASSIGNMENTS, TO NATIONAL RUBBER MACHINERY COMPANY, OF AKRON, OHIO, A CORPORATION OF OHIO

APPARATUS FOR MANUFACTURING TIRES

Application filed November 2, 1928. Serial No. 316,649.

This invention relates in general to tire making machinery and more particularly to apparatus for manufacturing tires in pulley band form.

One feature of the invention is the provision of a pair of stitching wheels mounted upon a movable support preferably operated by a treadle whereby foot pressure is utilized for holding the stitching wheels under a proper degree of pressure against the tire band.

Another feature of the invention is the provision of hand operated means preferably including a handwheel operable to move the stitchers simultaneously in opposite directions along the band while the treadle holds the stitchers under pressure against the band.

Another feature is the provision of clutch mechanism and a brake for the drum, both being controlled by treadles and cooperating with the drum, whereby the combination of treadles and the handwheel provide a machine embodying simplicity in operation, low manufacturing cost and having other advantages which will become apparent as the description proceeds.

Reference is to be had to the following specification and the accompanying drawings, in which:

Fig. 1 is a side elevation of a machine embodying the invention; and

Fig. 2 is an end elevation thereof.

In the accompanying drawings, the reference numeral 1 indicates a frame in which there is mounted a pair of bearings respectively 2 and 3 for rotatably supporting a horizontal shaft 4, upon one end of which there is secured a drum 5 adapted to receive materials constituting a tire band designated 6. For rotating the shaft 4 there is provided any suitable power device such as the electric motor 7 which is geared by means of a pinion 8 and a gear 9 connected through suitable clutch mechanism 10 to the shaft 4. The clutch mechanism may be of any suitable type and is herein shown as constituting a plate 11 carried by the gear 9 and a pair of cooperating plates 12 on opposite sides of the plate 11, forming a mulitple disc clutch and operated by arms 13 which are in turn actuated by a wedge shaped collar 14 thrown into and out of engagement with the arms 13 by a treadle 15 connected by means of an arm 16, a link 17 and a bell crank 18, which latter carries at its free end pins 19 running in a groove 20 of the member 14. When the clutch is once engaged, it tends to remain in engagement by the riding of the ends of the arms 13 on the cylindrical part of the collar 14 as shown in Fig. 1, until released as hereinafter described.

A pair of stitching wheels 21 and 22 are adapted to be held against the rotating tire band whereby to cause proper adhesion between the component parts of the band, as is readily understood in the tire art. The two wheels 21 and 22 are pivotally mounted, as indicated at 23, upon the free ends of a pair of arms 24 and 25, the other ends of which are pivoted at 26 and 27 in a member 28 which is secured upon a shaft 29 supported in suitable bearings 30 carried by a plate 31 attached to one side of the frame 1, as by fasteners 32. The arm 24 has secured thereto a sector gear 33 which meshes with a similar sector gear 34 fast to the other arm 25. These sector gears may be either integral with the arms 24 and 25 or else they may be secured thereto as by the pivot shafts 26 and 27 and fasteners 35. The sector gear 34 meshes with a rack 36 which is slidable in a pair of guides 37 and 38 associated with the member 28 and the shaft 29 and movable bodily with the latter two parts about the bearings 30.

A treadle 39 is secured, as indicated, at 40 to the member 28 and is operable to move said member 28 and all of the parts which it carries, whereby to cause the arms to move the wheels 21 and 22 into engagement with the tire band 6, and it will be seen that the amount of pressure exerted upon the band by the wheels will depend upon the degree of pressure applied to the treadle 39. With the wheels thus held firmly against the tire band 6 by means of the foot, means are provided for moving the wheels sidewise in opposite directions along the band 6 so as to perform the desired stitching operation. For the purpose of thus imparting motion to the stitching wheels 21 and 22, a handwheel 41 is employed. This handwheel is secured at one end of a shaft 42 mounted to slide and rotate in a bearing 42ª pivoted to the side of the frame 1, said shaft having at its other end a universal connection 43 which transfers rotation of shaft 42 to a stub shaft 44 having a pinion 45 meshing with a larger gear 46 on a stub shaft 47, which latter has a pinion 48 intermeshed with the rack 36. It will be seen that upon rotating the handwheel 41, that through the train of gear connections just described, the pinion 48 will cause longitudinal motion of the rack 36 and thereby impart movement to the arms 24 and 25 about their pivots 26 and 27, thereby causing the wheels 21 and 22 to move away from each other when the wheel is turned in one direction, and toward each other when the wheel is rotated in the opposite direction, thus carrying the wheels back and forth across the tire band 6 between its lateral edges. In order to maintain the axis of both of the wheels 21 and 22 in parallelism during the movement of the arms 24 and 25 across the band 6, a pair of connecting rods 49 and 50 are attached at their upper ends to arms 51 and 52 of the wheels 21 and 22 respectively and at their lower ends to stationary lugs 53 and 54 carried by the movable member 28. It will thus be seen that as handwheel 41 causes the arms 24 and 25 to move the stitchers in the described manner, that the connecting rods 49 and 50 will operate the arms 51 and 52 so as to maintain the axis of the wheels 21 and 22 in parallelism.

We do not herein broadly claim the described organization of drum and parts 21 to 52 inclusive, which is the sole invention of the applicant Shook and covered in his application Ser. No. 413,510, filed Dec. 12, 1929.

In order to stop rotation of the drum after the stitching operation is completed, a brake is provided. This brake preferably includes a drum 55 and a brake band 56. The stationary end of the brake band 56 is preferably adjustably held in a bracket as indicated at 57, the free end of the band being connected through a turn buckle 58 to a rod 59 which is guided by a bracket 60 between the top of which and the turn buckle there is provided a compression spring 61 which normally maintains the band 56 in non-braking position. The bottom of the rod 59 is connected at 62 to a treadle 63, so that pressure upon this treadle applies the brake band 55 and thus stops rotation of the tire band carrying drum 5.

It is evident that some means must be provided for disconnecting the clutch before applying the brake. To accomplish this purpose the treadle 63 carries a lug 64 which is adapted to coact with a similar lug 65 on the end of the clutch operating treadle 15. By an inspection of Fig. 2, it will be apparent that a downward push upon the treadle 63 will cause the lug 64 to engage the cam 65 and rock the treadle 15 about its shaft and thereby operate the train of connections 16, 17, 18 and 19, whereby to withdraw the cam shaped member 14 from between the clutch arms 13 and thereby release the clutch. Thus by the simple operation of pressing upon the brake treadle 63, the machine is disconnected from its power source and the drum comes to a quick stop, facilitating rapid handling of the work.

Adjacent the top of the machine there is preferably provided a tread marking device or scriber in the form of a rod 66 having a series of scribers 67 adjustable along the rod. The rod may be hingedly connected at 68 to a trunnion 69 which is supported by post 70 secured to the top of the frame 1 of the machine. There may also be provided a bead setter in the form of a handle 71 pivoted at 72 and swingable about the pivot to a position adjacent the tire band 6, whereby to dispose a pair of bead setting devices 73 in position to engage beads of the band. The bead setting devices 73 are preferably slidable on the arm 71 and are held in sliding adjustment by set screws 74.

With the foregoing description, it is obvious that various modifications may suggest themselves to those skilled in the art and it is therefore not intended to limit the invention except as defined in the appended claims.

Having thus described our invention, what we claim and desire to protect by Letters Patent is:

1. An apparatus for manufacturing tires in pulley band form, comprising in combination, a rotatable drum upon which the band may be built, a movable support, a pair of arms movably connected to said support, a stitching wheel carried by the free end of each arm, a treadle for operating said support to press the stitching wheels against said band, a handwheel, and connections between said handwheel and said arms operable to move the latter simultaneously in opposite directions on said band.

2. An apparatus for manufacturing tires in pulley band form, comprising in combination, a rotatable drum upon which the band may be built, a movable support, a pair of arms pivotally connected to said support, a stitching wheel carried by the free end of each arm, a sector gear fast to the pivoted end of each arm, the sector gears being intermeshed, a rack in mesh with one of said sector gears, a treadle for moving said support so as to press the stitching wheels against the band, a handwheel, and operating connections between the handwheel and said rack, whereby the arms are moved simultaneously toward or away from each other on said drum.

3. An apparatus for manufacturing tires in pulley band form, comprising in combination, a rotatable drum upon which the band may be built, a support, a pair of arms pivotally mounted on said support, a stitching wheel carried by the free end of each arm, a sector gear fast to the opposite end of each arm, the sector gears being intermeshed, a rack meshed with one of said sector gears, a pinion in mesh with said rack, a handwheel, and a train of connections including reduction gearing between said handwheel and the pinion, whereby the stitchers may be held against the band while the handwheel is operable to move the stitchers simultaneously in opposite directions on the band.

4. An apparatus for manufacturing tires in pulley band form, comprising in combination, a rotatable drum upon which the band may be built, a source of power, clutch mechanism between said source and the drum, a pair of stitching wheels, means for holding said wheels under pressure against the band, a handwheel, operating connections between the handwheel and the stitchers adapted to move the latter simultaneously in opposite directions on the band, means including a treadle for operating said clutch, a brake for the drum, a treadle for operating the brake, said brake treadle and said clutch treadle being operable one by the other, whereby application of the brake disengages the clutch and engagement of the clutch releases the brake.

5. In a band-building machine, the combination of a rotary drum, a stitcher having a feed movement thereover, a support for said stitcher, movable to carry it toward and away from the drum, gearing carried by said support for imparting the feed movement to said stitcher, and a hand-power device mounted independently of said support and having a handle within reach of an operator standing in front of the drum for actuating said gearing.

6. In a band-building machine, the combination of a rotary drum, a stitcher having a feed movement thereover, a support for said stitcher, pivoted to position the latter against or away from the drum, and a handpower shaft mounted separately from said support and geared to said stitcher for imparting said feed movement thereto.

7. In a band-building machine, the combination of a rotary drum, a rocking support, a stitcher mounted on said support and having a feed movement across the drum, gearing carried by said support for imparting said feed movement, a hand-power shaft, and a universal joint for connecting said shaft to the gearing to actuate the latter.

8. In a band-building machine, the combination of a rotary drum, a support pivoted on an axis parallel thereto, below and at the rear of the drum, a pair of upwardly-projecting, oppositely movable, interconnected arms pivoted to said support and having stitching rollers in the rear of said drum, and a treadle carried by said support and projecting downwardly and forwardly therefrom for rocking the latter.

9. In a band-building machine, the combination of a rotary drum, a rocking support, a stitcher carried thereby, a fixed support, a shaft-guiding and bearing member pivoted on the latter, and a hand-power shaft mounted to slide and rotate in said member and having connections with said stitcher, including a universal joint, for imparting feed movements to the stitcher.

10. In a band-building machine, the combination of a casing, a drum rotatably mounted thereon, a support pivoted below and at the rear of said drum and having a pair of stitcher-carrying arms projecting upwardly in the rear of the drum, means for rocking said support to position the stitchers radially of the drum, gearing on said support for imparting lateral feed movements to said arms, a shaft-bearing pivoted on said casing, and a hand-power shaft slidably and rotatably mounted in said bearing and having a universal-joint connection with said gearing.

11. In a band-building machine, the combination of a rotary band form, a clutch-controlling member, a form-rotating clutch controlled by said member and adapted to remain engaged when clutch-setting pressure is removed from the controlling member, a form-arresting brake, and brake-controlling means operating to release the clutch when said brake is set.

12. In a band-building machine, the combination of a rotary drum, a clutch pedal, a drum-rotating clutch controlled by said pedal and adapted to remain engaged when the pedal is depressed, a drum-arresting brake, and a second pedal controlling said brake and interconnected with the clutch brake and interconnected with the clutch pedal for moving the latter to a clutch-releasing position by the brake-setting movement of the second pedal.

Signed at Columbiana, county of Columbiana, State of Ohio, this 18th day of October, 1928.

FLORAIN J. SHOOK.

Signed at Columbiana, county of Columbiana, State of Ohio, this 18th day of October, 1928.

ALLEN L. HESTON.